(12) United States Patent
Haushalter

(10) Patent No.: US 10,427,596 B2
(45) Date of Patent: Oct. 1, 2019

(54) VEHICLE DIRECTIONAL INDICATOR FOR AUTONOMOUS AND NON-AUTONOMOUS VEHICLES

(71) Applicant: Alexa Lea Haushalter, Bellefontaine, OH (US)

(72) Inventor: Alexa Lea Haushalter, Bellefontaine, OH (US)

( * ) Notice: Subject to any disclaimer, the term of this patent is extended or adjusted under 35 U.S.C. 154(b) by 0 days.

(21) Appl. No.: 15/731,754

(22) Filed: Jul. 27, 2017

(65) Prior Publication Data

US 2019/0031091 A1 Jan. 31, 2019

(51) Int. Cl.
*B60Q 1/38* (2006.01)
*B60Q 1/26* (2006.01)
*B60Q 1/34* (2006.01)
*B60Q 1/50* (2006.01)
*B60Q 3/10* (2017.01)
*B60R 16/033* (2006.01)

(52) U.S. Cl.
CPC ............. *B60Q 1/50* (2013.01); *B60Q 1/2607* (2013.01); *B60Q 1/343* (2013.01); *B60Q 1/346* (2013.01); *B60Q 1/38* (2013.01); *B60Q 3/10* (2017.02); *B60R 16/033* (2013.01)

(58) Field of Classification Search
CPC ................................................ H04W 72/0453
USPC .......................................... 375/260; 340/475
See application file for complete search history.

(56) References Cited

U.S. PATENT DOCUMENTS

| 5,790,017 | A | 8/1998 | Berryhill | |
|---|---|---|---|---|
| 7,449,997 | B2 | 11/2008 | Furusawa et al. | |
| 2004/0065249 | A1* | 4/2004 | Williams | B60Q 1/2665 116/35 R |
| 2004/0143381 | A1* | 7/2004 | Regensburger | B60Q 1/346 701/36 |
| 2005/0110629 | A1* | 5/2005 | Williams | B60Q 1/2661 340/463 |
| 2008/0282966 | A1* | 11/2008 | Williams | B60Q 1/0035 116/35 R |
| 2012/0166072 | A1* | 6/2012 | Tamaoki | B60W 30/18154 701/300 |
| 2014/0266665 | A1* | 9/2014 | Haushalter | B60Q 1/50 340/464 |
| 2015/0203033 | A1* | 7/2015 | Watanabe | B60R 1/00 348/148 |
| 2015/0228195 | A1* | 8/2015 | Beaurepaire | G08G 1/0962 340/907 |
| 2015/0258928 | A1* | 9/2015 | Goto | B60Q 1/085 701/49 |

(Continued)

*Primary Examiner* — Santiago Garcia

(74) *Attorney, Agent, or Firm* — Barbara Joan Haushalter

(57) ABSTRACT

A vehicle directional indicator is provided for enhancing the safety and knowledge of all persons using roadways, including drivers, pedestrians, and bikers. Depending on the position applied to the directional indicator for a driver or driverless vehicle, power can be sent to the left turn signal light or the right turn signal light or the straight ahead signal light. These signal lights include indicator lights on the dashboard, as well as front and rear exterior indicator lights. The straight ahead directional indication is particularly useful at an intersection, where multiple vehicles and pedestrians are weighing the directional indicators of the other vehicles at the intersection, assured clear distances, oncoming traffic and multiple other traffic patterns, to provide the safest and most timely continued travel.

6 Claims, 6 Drawing Sheets

(56) References Cited

U.S. PATENT DOCUMENTS

| | | | |
|---|---|---|---|
| 2016/0009218 A1* | 1/2016 | Nakashima | B60Q 1/20 |
| | | | 701/36 |
| 2016/0280134 A1* | 9/2016 | Miura | B60Q 9/008 |
| 2017/0080850 A1* | 3/2017 | Drexler | B60K 1/00 |
| 2017/0088038 A1* | 3/2017 | Geller | B60Q 1/50 |
| 2017/0106750 A1* | 4/2017 | Tauchi | B60R 1/00 |
| 2017/0240096 A1* | 8/2017 | Ross | B60Q 1/50 |
| 2017/0249844 A1* | 8/2017 | Perkins | B60W 50/0097 |
| 2017/0297606 A1* | 10/2017 | Kim | B62D 1/181 |
| 2018/0024246 A1* | 1/2018 | Jeong | G01S 17/89 |
| | | | 359/204.1 |
| 2018/0056851 A1* | 3/2018 | Kim | B60Q 1/085 |
| 2018/0074490 A1* | 3/2018 | Park | G07C 5/008 |
| 2018/0083347 A1* | 3/2018 | Lee | H01Q 1/3275 |
| 2018/0244195 A1* | 8/2018 | Haight | B60R 11/04 |

* cited by examiner

VEHICLE DIRECTIONAL INDICATOR FOR AUTONOMOUS AND NON-AUTONOMOUS VEHICLES

FIELD OF THE INVENTION

This invention relates generally to vehicle directional indicator signals, and more particularly, to a vehicle directional indicator signal that indicates a straight ahead direction incorporated into the left and right turn directional signals, to indicate a straight ahead directional intention of a human or robot driver or driverless vehicle.

BACKGROUND OF THE INVENTION

In automobiles now in use, a turn signal switch is installed within easy reach of the driver of the vehicle, on or around the steering wheel. When a driver intends to turn right or left, the driver moves the turn signal switch or lever, activating an exterior indicator light in the front and rear of the vehicle. This alerts both oncoming drivers and trailing driver, as well as pedestrians and cyclists and others using the roadways, of the intention of the driver. Turn signals warn other drivers of impending moves to minimize hazards and abrupt actions.

With the rapidly advancing technology and concurrent cultural acceptance of autonomous vehicles, the directional intention of a vehicle, whether driver or driverless, is becoming more important for a variety of reasons, including to allow traffic to flow effectively, to allow vehicles to communicate, and to allow traffic to flow safely. Failing to signal, or ambiguity in signaling, may be the cause of accidents, and can be a source of "road rage" as well. Consequently, it is quite important for vehicles to use directional signals to indicate intentions.

When vehicles approach a two-way or four-way stop, drivers will typically pay attention to the exterior turn signal indicators of the other vehicles at the intersection. If two facing vehicles are both turning left, or both turning right, the two facing drivers can often leave the intersection simultaneously, keeping the flow of traffic constant. Currently, pedestrians at these intersections often make eye contact with a driver who might cross the intended path of the pedestrian, to ascertain the directional intention of the driver and even receive a nod of acknowledgment to indicate that the driver will wait for the pedestrian to safely cross. With the rapidly advancing technology and concurrent cultural acceptance of autonomous vehicles, the ability to make eye contact with a driver and receive a human response such as a nod or other acknowledgment of presence, is disappearing. Hence, it is becoming even more important for a pedestrian, who is an island adrift in the center of a busy intersection, to have a reliable means to determine directional intention of a vehicle for safety and traffic efficiency purposes. Although the prior art is replete with turn signal variations, such as is disclosed in Berryhill U.S. Pat. No. 5,790,017, Berryhill does not disclose a dynamic engagement option for when straight directional travel is intended, only for a turn. In the prior art, no attention has been given to providing a non-passive indication of straight ahead directional travel with the exception of Haushalter Ser. No. 13/815,679, which disclosed a straight ahead indicator signal for a vehicle. But now, driverless vehicles need a means of communicating directional intention amongst and between vehicles. Passive indication, such as no signal when the intended direction is straight ahead, is ambiguous. An engaged, dynamic indication is more efficient and effective, contributing to a safer traffic experience for all.

During the transition period when autonomous vehicles are being introduced onto roadways, confusion as to the intentions of other vehicle, especially at a busy intersection, can slow traffic and can even result in accidents. Confusion often occurs at such intersections when a vehicle does not have any turn signal indicator on at all. The other drivers, driverless vehicles and pedestrians are left to wonder if the non-indicator vehicle is really going straight ahead, or if the non-indicator driver simply forgot to activate his or her turn signal. At a busy intersection, this confusion can create safety hazards and undesirable traffic flow problems. And as eye contact with a human driver becomes less common with the influx of autonomous vehicles, the guessing of intentions becomes even more obscure and difficult.

Therefore, among the purposes of this invention is to improve the safety of vehicle as well as pedestrian travel. It is a further purpose of the present invention to provide a directional signal indicator for a vehicle. It is a particular purpose of this invention to provide such a directional signal that can indicate not only a left turn or a right turn, but also a straight ahead directional indicator. It is an additional purpose of the present invention to provide this non-passive directional indication for human-operated vehicles as well as fully and partially autonomous vehicles.

SUMMARY OF THE INVENTION

These purposes are achieved by the vehicle directional signal system and method according to the present invention, wherein a vehicle directional signal indicates a left turn intention of a vehicle, a right turn intention of a vehicle, and a straight ahead directional intention of a vehicle. The straight ahead directional indication is particularly useful at an intersection, where multiple driver and driverless vehicles are computing or evaluating the directional intentions of the other vehicles at an intersection, assured clear distances, oncoming traffic and multiple other traffic patterns, to make the safest and most timely continued travel for themselves.

In accordance with one embodiment of the present invention, a vehicle directional indicator system indicates the directional travel intentions of a vehicle that comprises an ignition system, a directional signal circuit for receiving power when the ignition is keyed on, a power source for transporting the power, and a thermal flasher for receiving the power from the power source. A particular component of the present invention provides a directional indicator for dynamically indicating direction of intended travel, whereby the directional indicator non-passively indicates a straight ahead directional intention for the vehicle in addition to being capable of dynamically indicating a left turn or a right turn directional intention for the vehicle. The vehicle can be a human-operated vehicle, as well as a partially or fully autonomous vehicle.

In accordance with the present invention, a turn signal circuit gets power when an ignition is engaged. The power goes through a fuse panel or power source into a thermal flasher. From there, it continues to a directional indicator typically associated with the steering column. Depending on the position applied to the directional indicator, the power either stops in the switch, or gets sent to the left turn signal light or the right turn signal light or the straight ahead signal light. These signal lights include interior indicator lights on the dashboard, as well as front and rear exterior indicator lights. Power flows through the filament of the lights and then is grounded.

The straight ahead directional signal is activated by the driver or the computer associated with a fully or partially autonomous vehicle, and can be retrofitted or added to the existing left and right turn signal indicators. The straight ahead directional indicator light is located on the front and rear of a vehicle in conjunction with turn signal lights. Alternatively, the straight ahead directional indicator signal could be a completely separate switch or lever, operating similarly to the left and right turn signal switches or levers. The straight ahead directional indicator light comprises an ambient light source visible during day light and night hours.

The primary advantage provided by the present invention is to indicate to other vehicles and pedestrians, for example at an intersection, the intention of a vehicle to either turn or to continue straight. Another object of the present invention is to provide an additional signal indicator for a vehicle, which can warn other motorists, vehicles and pedestrians of the intent of a human or robot driver, a computer-assisted driver, or a driverless vehicle. Yet another object of the present invention is to provide a safer means of vehicle travel, and help prevent motor vehicle and pedestrian-vehicle accidents. Finally, it is an object of the present invention to facilitate efficient, effective and safe vehicle travel for all vehicles on a road, whether driver or driverless.

Other objects and advantages of the invention will be apparent from the following description, the accompanying drawings and the appended claims, to which reference may be had for a full understanding of the nature of the present invention.

DESCRIPTION OF THE PREFERRED EMBODIMENT

Figure 3A:
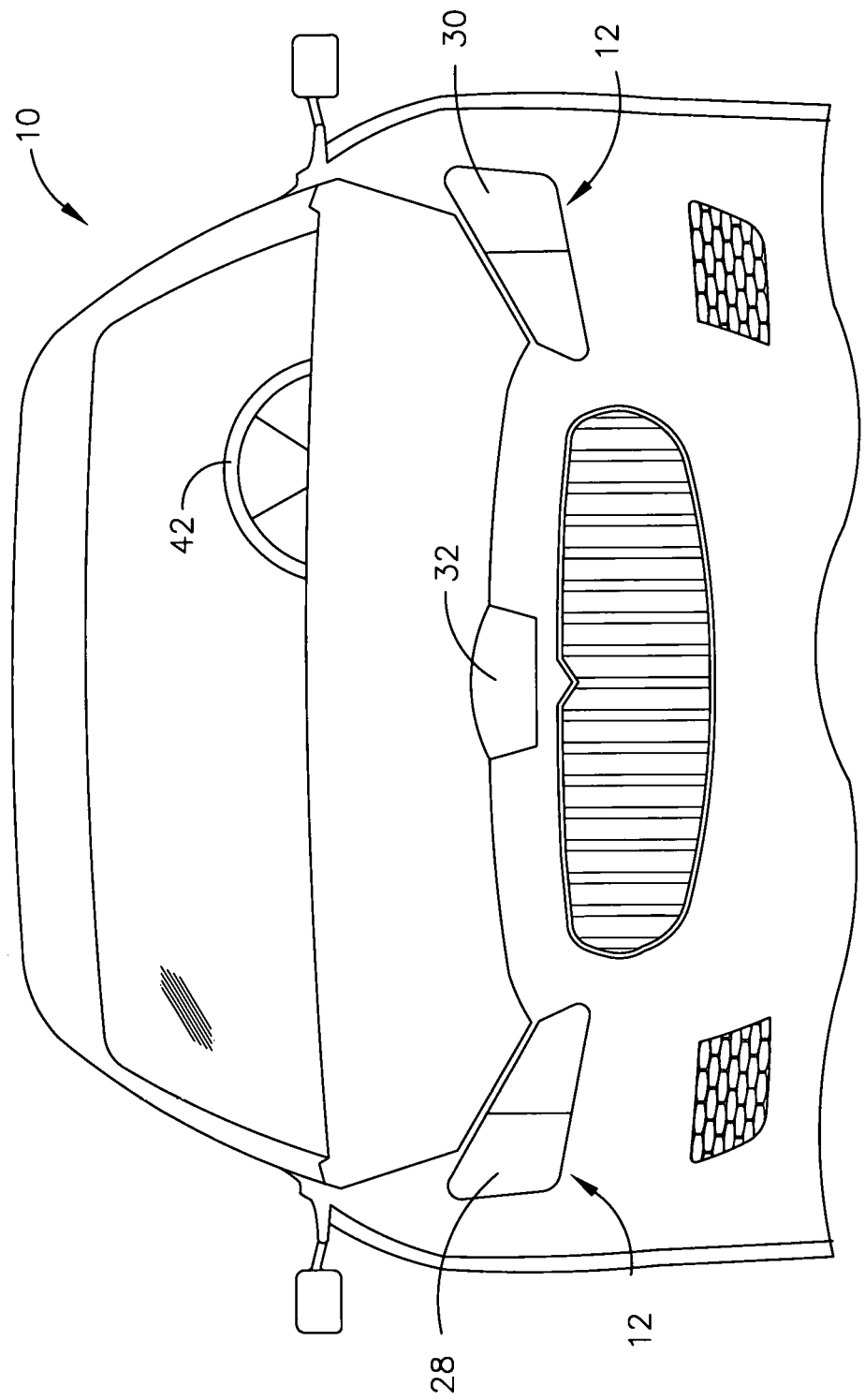
FIGS. 3A and 3B illustrate front and back views, respectively, of a vehicle, to illustrate the present invention.
Figure 3B:
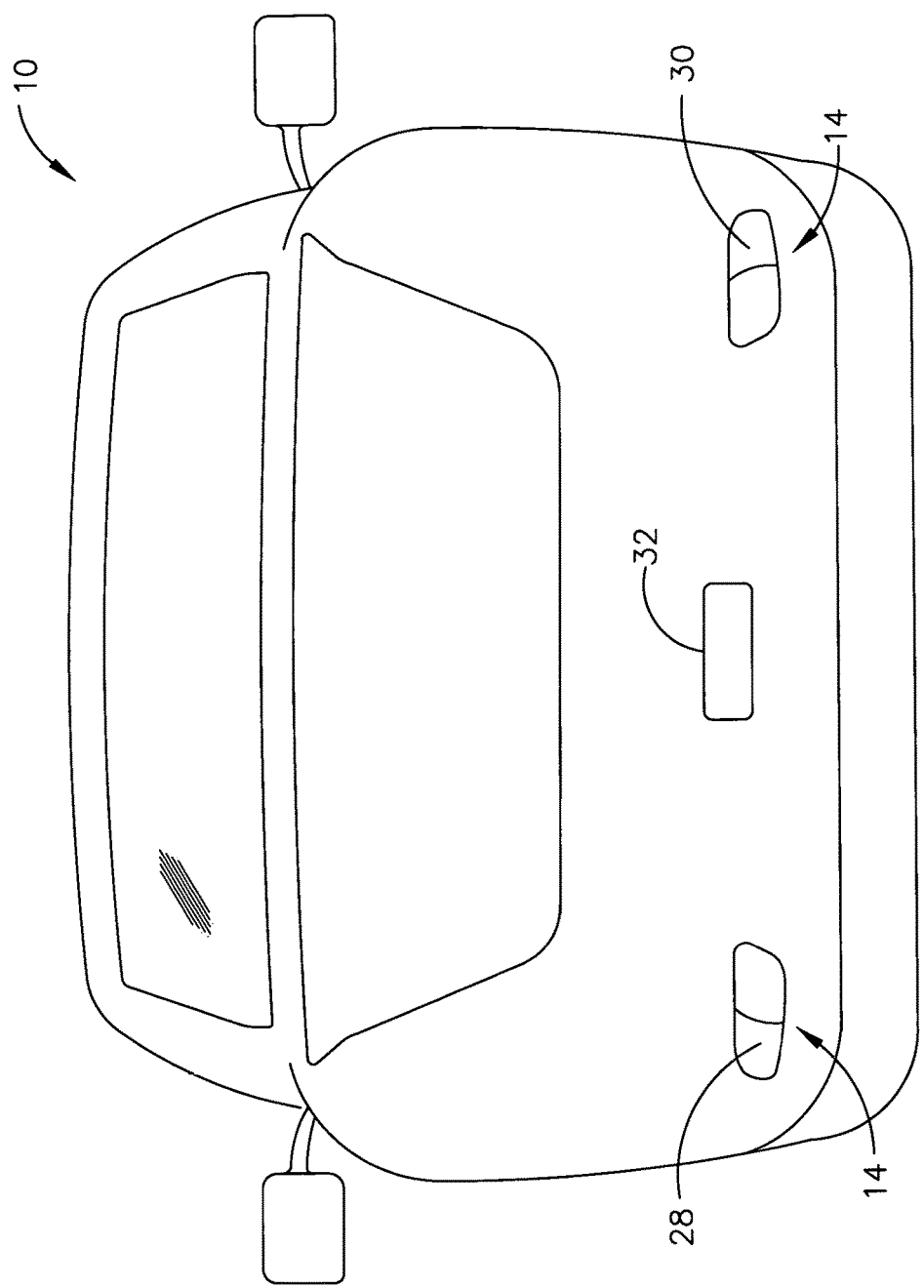

Directional indicators, or turn signals, in vehicles work either manually by a driver or autonomously by a computer by activating a lever or switch or indicator in a vehicle 10, such as is illustrated in FIGS. 3A and 3B. The directional intentions of a vehicle are indicated at the front and back of the vehicle 10 exterior, at light sources 12 and 14, respectively. As illustrated in the directional indicator circuit diagram 16 of FIG. 1, a directional signal is powered up via a power source 18 when the vehicle ignition 20 is turned on. The power source 18 can be any suitable power source, such as a grounded battery power source, a fuse panel, or a junction box, sufficient to transfer power. The power travels from the power source 18 into the thermal flasher 22 to the steering column 24 of the vehicle 10. From here, in accordance with the present invention, the power either stops in the directional indicator switch 26, or continues to the directional indicator lights 28, 30 and 32, as well as to indicator lights 44 on the vehicle dashboard, and flashes directional indicators at light sources 12 and 14 on the front and rear of the vehicle 10.

Figure 1:
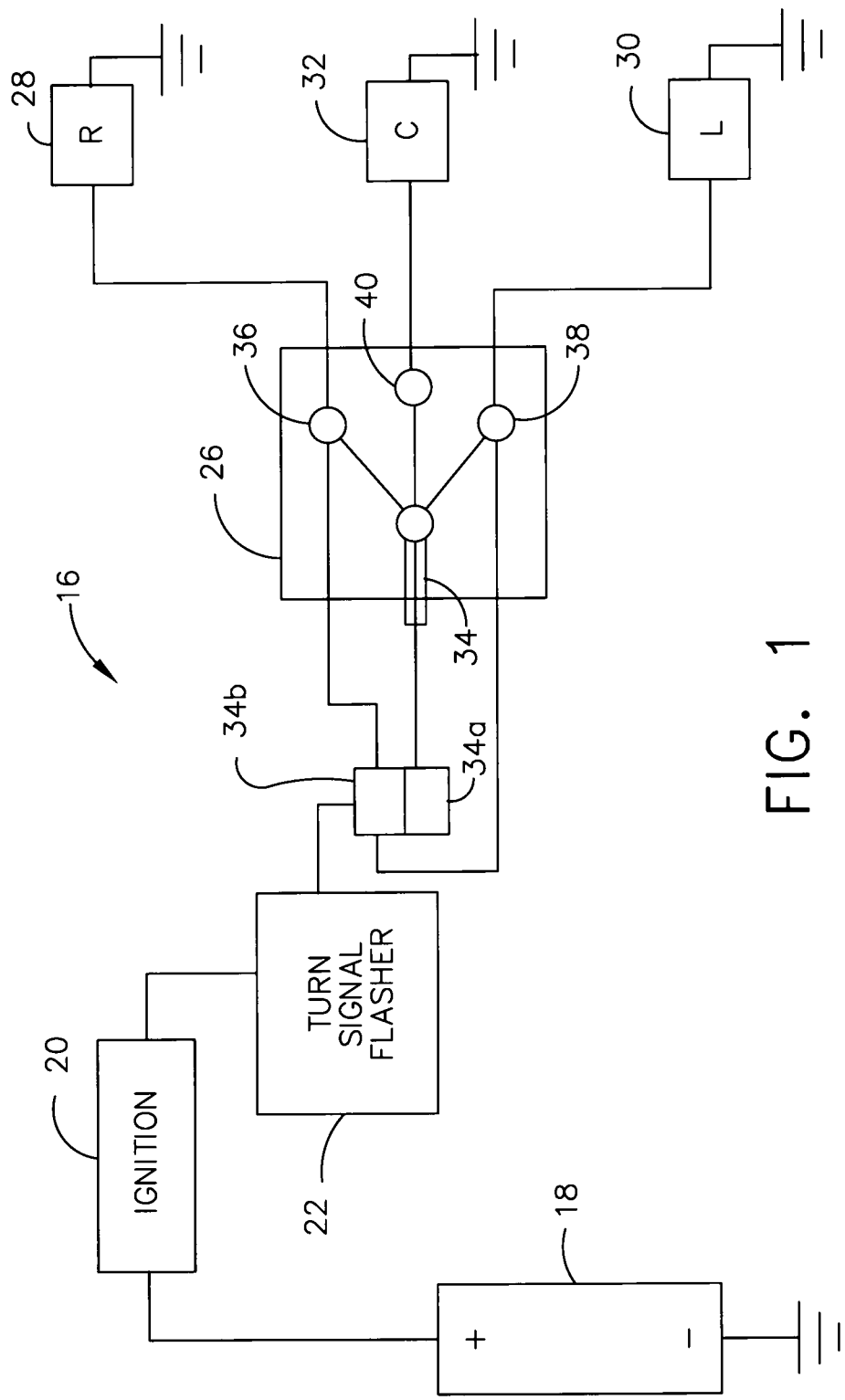
FIG. 1 illustrates a schematic diagram of a turn signal indicator system according to one embodiment of the present invention.
Figure 2:
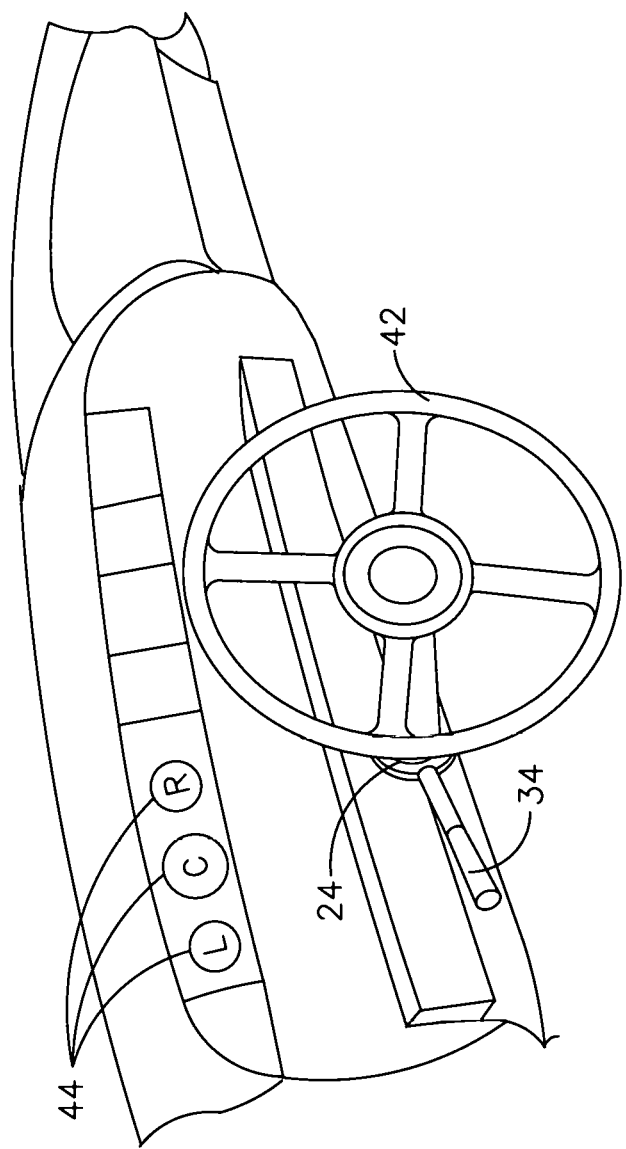
FIG. 2 illustrates a steering column view of a vehicle.

Continuing with FIG. 1 and referring also to FIG. 2, an activator or turn signal lever 34, in the vehicle 10 is multi-positional to allow indication of the directional intention of the driver. The signal lever 34 is typically located proximate to the steering column 24 and steering wheel 42, and is powered by the battery 18 and actuated by the driver to signal his directional intentions. For example, continuing with FIG. 1 and referring also to FIGS. 3A and 3B, pushing up on the lever 34 as illustrated by position 36 will cause the right-turn signal 28 to flash; pushing down on the lever 34 as illustrated by position 38 will cause the left turn signal 30 to flash; and pushing inward or forward on the lever 34 as illustrated by position 40 will cause the straight ahead directional indicator light 32 to flash.

In an alternative embodiment of the present invention, also illustrated in FIG. 1, the straight ahead directional indicator can be activated by a completely separate activator, such that lever 34 is comprised instead of an activation 34a for the straight ahead directional indicator light, and an activation 34b would activate the left and right directional turn signal lights.

The flasher 22 utilizes the 12-volt power source 18 of the vehicle's electrical system to heat up an internal bi-metallic strip. When the directional indicator is activated, power is sent to the flasher unit 22 to activate interior lights to inform the driver or the driver computer that the directional indicator has been activated, and exterior directional indicator lights 28, 30 and 32, for the benefit of other drivers, vehicles, vehicle computer systems, cyclists, and pedestrians.

The addition of the straight ahead directional indicator in accordance with the present invention is particularly advantageous for indicating to other vehicles, drivers, and pedestrians, particularly when stopped at an intersection, the stated intention of the vehicle to either turn or to continue straight. For autonomous or partially autonomous vehicles communicating at an intersection, the dynamic indicator is more readily perceived and computed than a passive indicator. The non-passive straight ahead directional indicator can be operated and controlled by whatever entity is operating and controlling the motor vehicle, whether the entity is a human, computer-assisted, or partially or fully computer controlled or autonomous.

Figure 4:
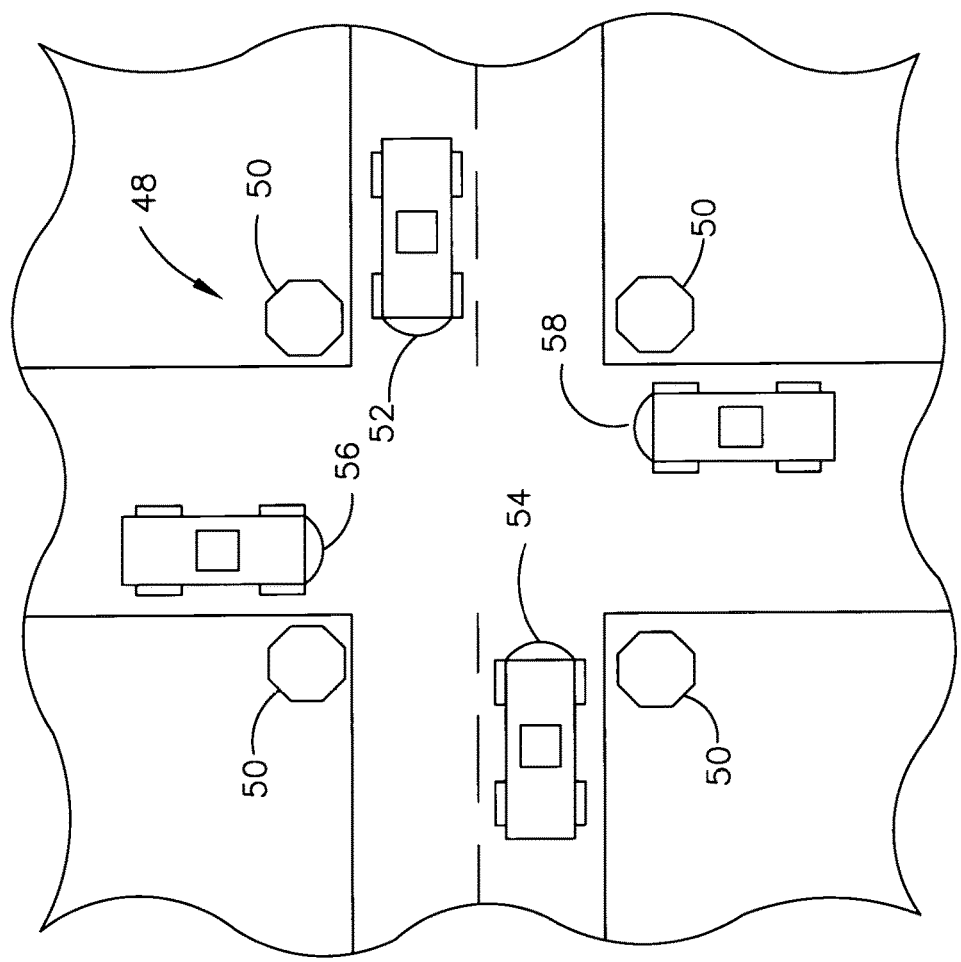
FIG. 4 illustrates the directional options for multiple vehicles at an intersection, for purposes of description in detailing advantages of the present invention.

Referring to FIG. 4, a 4-way intersection 48 is shown, for the purpose of illustrating this particular advantage according to the present invention. Intersection 48 is a 4-way stop intersection, meaning that every vehicle approaching the intersection must stop at stop sign 50 before proceeding either right, left, or straight ahead. At any intersection, it is not only useful, but statistically safer, to know the directional intentions of the other vehicles at the intersection, whether the vehicles are human-driven or autonomous. If two facing vehicles, 52 and 54 or 56 and 58, are both turning left, or both turning right, or both proceeding straight ahead, the two facing vehicles can often leave the intersection simultaneously, keeping the flow of traffic constant. With the continued growth and quantity of driverless vehicles as well as vehicles with robot drivers or computer-assisted human drivers, it becomes more practical and possible than ever to engage dynamic directional indicators so the vehicles can all communicate and maximize safety and traffic flow efficiency.

Similarly, two perpendicular vehicles, for example 52 and 56, can also proceed simultaneously when both are turning right, or the vehicle 52 to the right is turning right and the other 56 is going straight ahead, or even if one is turning right and the other is turning left. Clearly, then, if each of the vehicles 52, 54, 56 and 58 all know the intentions of all of the other vehicles at intersection 48, safety hazards and undesirable traffic flow problems can be reduced or eliminated. The addition of the straight ahead directional intention of a vehicle, in accordance with the teachings of the present invention, is an extremely manageable addition to any vehicle, whether human operated or computer operated, whether human driven or driverless, whether fully autonomous or partially autonomous, with the enormous payoff of improving driver and pedestrian, safety and traffic flow.

Figure 5:
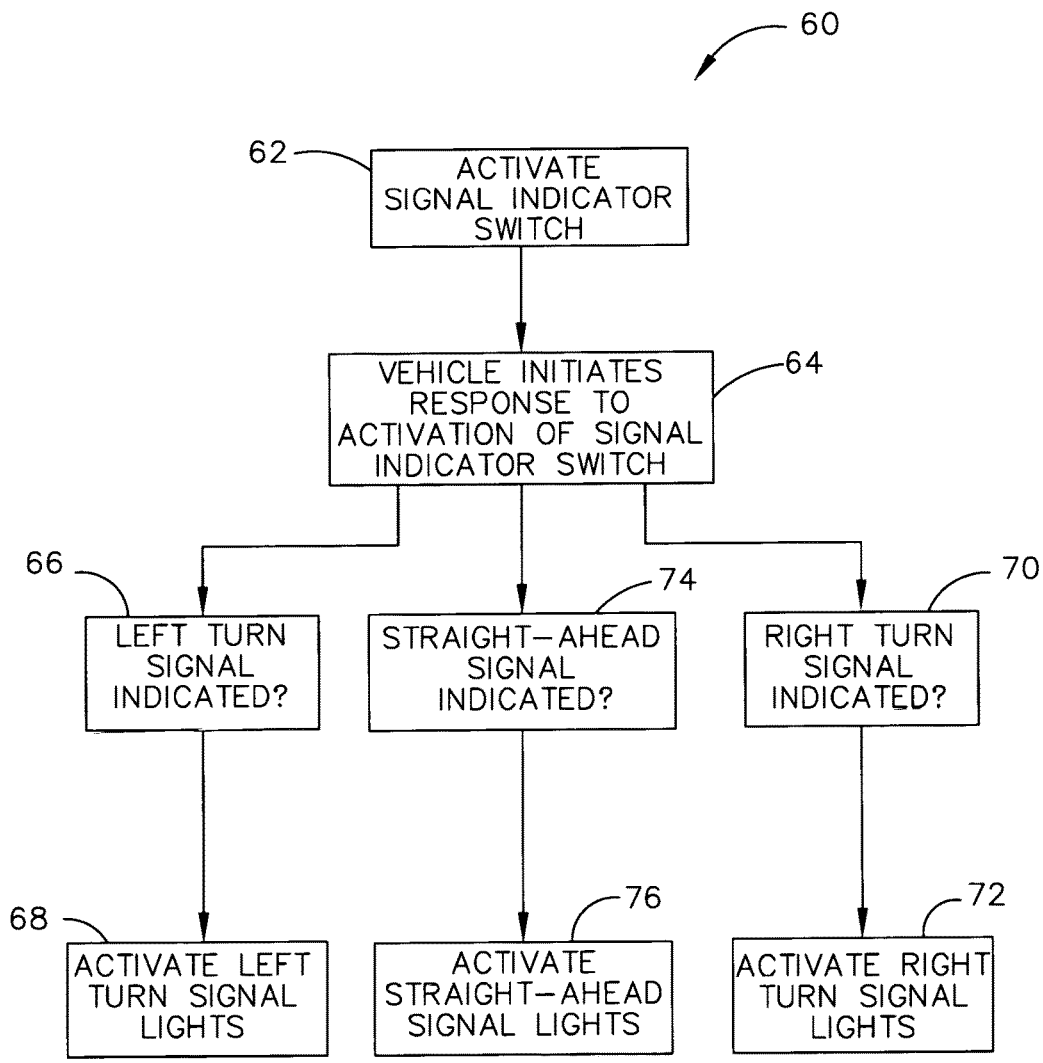
FIG. 5 is a flow chart illustrating the method of activating directional signal indicators in accordance with an embodiment of the present invention.

Flowchart 60 of FIG. 5 illustrates a preferred embodiment of the present invention. As indicated by block 62, when a signal indicator switch of a vehicle is activated, the vehicle computer recognizes the activation in block 64. Specifically, the driver or the computer operator can indicate a left direction, as in block 66, by activating the left turn directional indicator lights in block 68; the driver or the computer operator can indicate a right direction, as in block 70, by activating the right turn directional indicator lights in block 72; or the driver or the computer operator can indicate a straight ahead direction, as in block 74, by activating straight ahead directional indicator lights, as indicated in block 76.

The vehicle directional indicator according to the present invention offers a number of advantages over the existing art. The present invention adds another valuable piece of information for all drivers, whether human or robot or computer-assisted, as well as driverless vehicles on the road, and also for pedestrians and cyclists, to make vehicular travel safer and more efficient. The present invention accomplishes this by providing a vehicle directional indicator that alerts others as to not only the left or right turn direction intentions of a vehicle, but also the straight ahead travel directional intention of a vehicle. This alerts both oncoming vehicles and trailing vehicles of the intention of other vehicles on the road. Turn signals warn other vehicles of impending moves to minimize hazards and abrupt actions; the addition of a straight ahead directional indicator will enhance the safety and knowledge of all persons and vehicles using the roadways.

The foregoing discussion describes in detail a particular and preferred embodiment of the present invention, wherein the straight ahead signal indicator light is integrated into the existing left and right turn signal indicator. It will be obvious to those skilled in the art that multiple embodiments are possible without departing from the scope and content of the present invention, specifically, the addition of a straight ahead signal indicator. For example, the straight ahead signal indicator could be activated by a completely separate means than the left and right turn signal activator. Activation of the straight ahead signal indicator could be an independent switch or lever, not directly associated with the left and right turn signal indicators. The directional intention could be activated by a computer or robot driver. Furthermore, the precise location of the ambient lights on the front and rear of the vehicle, indicating straight ahead travel, could be in a variety of locations, but are described as being approximately centered and horizontally lined up with the existing ambient left and right turn signal lights. It is also anticipated that the straight-ahead indicator lights will approximately match the color and size of the left and right indicator lights, but it will be obvious to those skilled in the art that any such visual preference or design does not depart from the scope of the invention described herein.

Having described the invention in detail and by reference to the preferred embodiment thereof, it will be apparent that other modifications and variations are possible without departing from the scope of the invention defined in the appended claims.

What is claimed is:

1. A vehicle directional indicator system for indicating the directional travel intentions of a vehicle, the system comprising: an ignition system; a directional signal circuit for receiving power when the ignition is keyed on; a power source for transporting the power; a thermal flasher for receiving the power from said power source; a directional indicator associated with a steering column for the vehicle for dynamically indicating direction of intended travel, whereby said directional indicator dynamically indicates a straight non-passive ahead directional intention for the vehicle in addition to dynamically indicating a left turn or a right turn directional intention for the vehicle whereby said vehicle is anywhere within the range of fully autonomous to non-autonomous.

2. A vehicle directional indicator system as claimed in claim 1 whereby said directional indicator is multi-positional.

3. A vehicle directional indicator system as claimed in claim 2 whereby depending on position applied to the multi-positional directional indicator, power is sent to a left turn signal indicator light or a right turn signal light indicator light, or a straight ahead signal indicator light.

4. A vehicle directional indicator system as claimed in claim 1 whereby said signal indicator lights include indicator lights on an interior dashboard of the vehicle.

5. A vehicle directional indicator system as claimed in claim 1 whereby said signal indicator lights include indicator lights on said front and rear exteriors of the vehicle.

6. A vehicle directional indicator system as claimed in claim 1 whereby power flows through a filament of said signal indicator lights and is grounded.

* * * * *